United States Patent [19]
Alessio

[11] Patent Number: 5,977,518
[45] Date of Patent: Nov. 2, 1999

[54] FOOD WARMER FOR SWEET AND SALTED PRODUCTS

[76] Inventor: Katia Alessio, Via Vallà, 33, 31030 Caselle Di Altivole, Italy

[21] Appl. No.: 09/252,783

[22] Filed: Feb. 19, 1999

[51] Int. Cl.⁶ .................................................. A21B 1/52
[52] U.S. Cl. .......................... 219/387; 219/385; 219/521
[58] Field of Search .................................... 219/385–387, 219/520, 521; 99/331, 325, 468

[56] References Cited

U.S. PATENT DOCUMENTS

| | | | |
|---|---|---|---|
| 3,805,018 | 4/1974 | Luong et al. ............................. | 219/387 |
| 3,814,900 | 6/1974 | Frey et al. ................................ | 219/385 |
| 3,831,001 | 8/1974 | Toomey et al. .......................... | 219/386 |
| 5,808,276 | 9/1998 | Padilla ..................................... | 219/386 |

*Primary Examiner*—Tu Ba Hoang
*Attorney, Agent, or Firm*—Guido Modiano; Albert Josif; Daniel J. O'Byrne

[57] ABSTRACT

A food warmer for sweet and salted products, comprising a base and a cover which are mutually articulated and contain heating and insulation devices for a first plate and a second plate. The peculiarity of the food warmer consists in that at least one of the plates has one or more seats provided with at least two regions having different depths; this allows to heat products being various in shape and thickness.

8 Claims, 3 Drawing Sheets

FOOD WARMER FOR SWEET AND SALTED PRODUCTS

BACKGROUND OF THE INVENTION

The present invention relates to a food warmer for sweet and salted products.

Nowadays it is known to heat salted products, such as sandwiches, by means of devices known as food warmers which are usually constituted by a base and a cover which are mutually articulated and inside which two flat plates are associated. The plates usually have an undulated outer surface and the sandwich is arranged between them and is thus pressed by the plates to warm it.

This known solution has at least two drawbacks: first of all, both the bread and the product contained in the sandwich are heated and the product is therefore cooked, altering some of its organoleptic characteristics, since it is for example ham and/or salad and/or tomato etcetera.

Secondly, cooking requires a variable time which can be as long as three minutes.

It is also known to warm sweet products, such as for example buns, which have a substantially circular shape and inside which a filling, such as jam, ice cream, whipped cream or other creams is added. Food warmers are thus known having a base and a cover which are mutually articulated, and having a half-plate each which are identical one another in shape and form, and defining, when placed in contact, a shell-like configuration which surrounds the product.

An electric resistor is coupled inside each one of the half-plates in order to heat it.

Such food warmers allow to warm the bun externally without heating its contents.

This solution, however, has drawbacks: the user must in fact use buns whose plan shape is complementary to the shape of the half-plates and therefore he can warm only one type of product.

SUMMARY OF THE INVENTION

The aim of the present invention is to solve the mentioned problems, eliminating the drawbacks of the cited prior art and thus providing a food warmer which allows to warm both sweet and salted products, heating the outer container of the product but not its contents.

Within the scope of this aim, an object of the present invention is to provide a food warmer in which it is possible to warm sweet and salted products of various sizes and/or heights without squashing them in any way.

Another object of the present invention is to provide a food warmer in which it is possible to achieve high productivity and therefore warm a larger number of products per selected unit of time.

A further object of the present invention is to provide a food warmer for salted products which allows to maintain the organoleptic characteristics of the ingredients contained for example inside the sandwich.

Another object of the present invention is to provide a food warmer which is reliable and safe in use and has low manufacturing costs.

This aim, these objects and others which will become apparent hereinafter are achieved by a food warmer for sweet and salted products, comprising a base and a cover which are mutually articulated; at least one first and one second plate respectively accomodated into said base and cover; and heating and insulation devices for said at least one first plate and one second plate, characterized in that at least one of said first and second plates has at least one seat provided with at least two regions having different depths.

BRIEF DESCRIPTION OF THE DRAWINGS

Further characteristics and advantages of the present invention will become apparent from the following detailed description of a particular but not exclusive embodiment, illustrated only by way of non-limitative example in the accompanying drawings, wherein.

DESCRIPTION OF THE PREFERRED EMBODIMENTS

Figure 1:
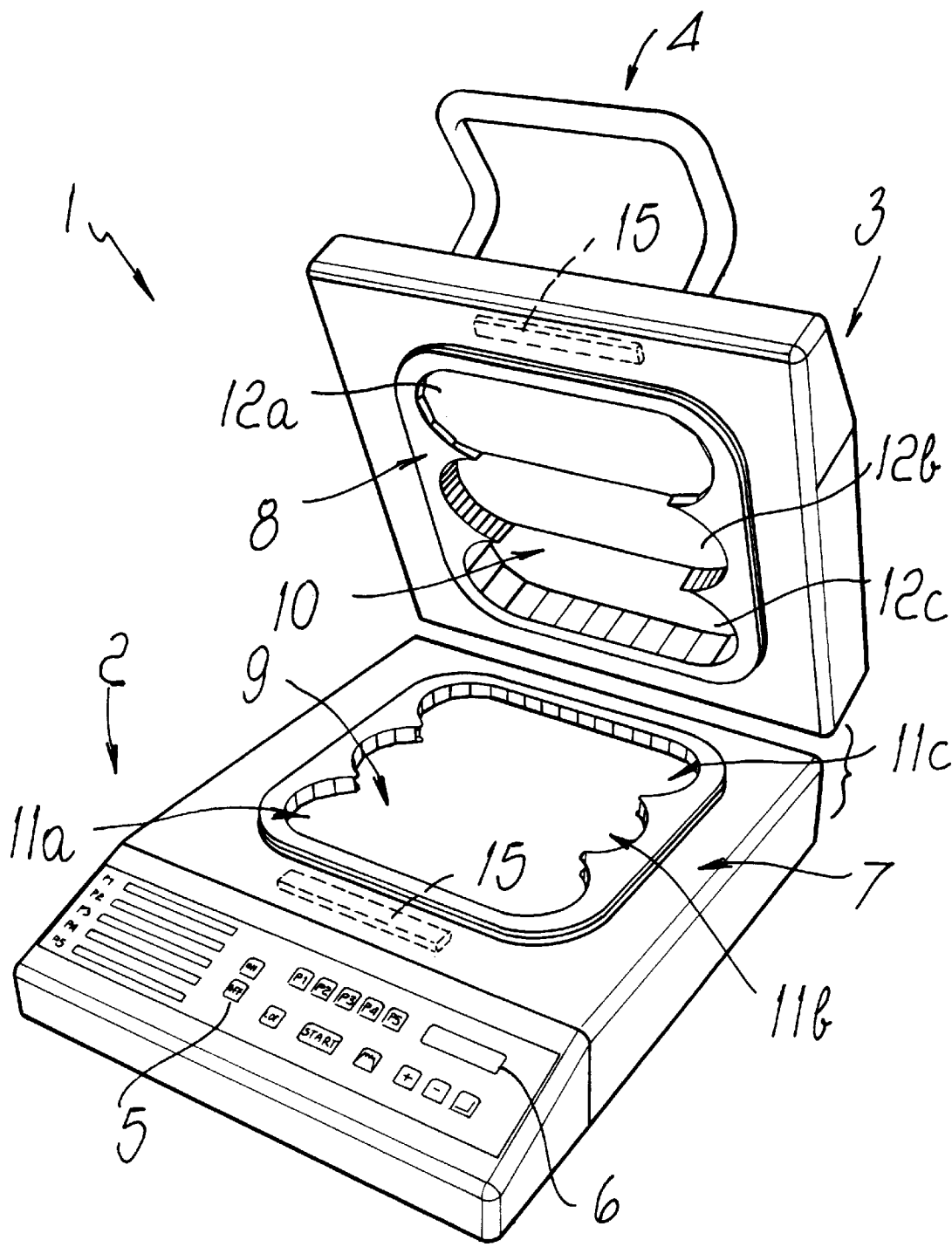
FIG. 1 is a perspective view of the food warmer according to the present invention, with the cover raised.
Figure 2:
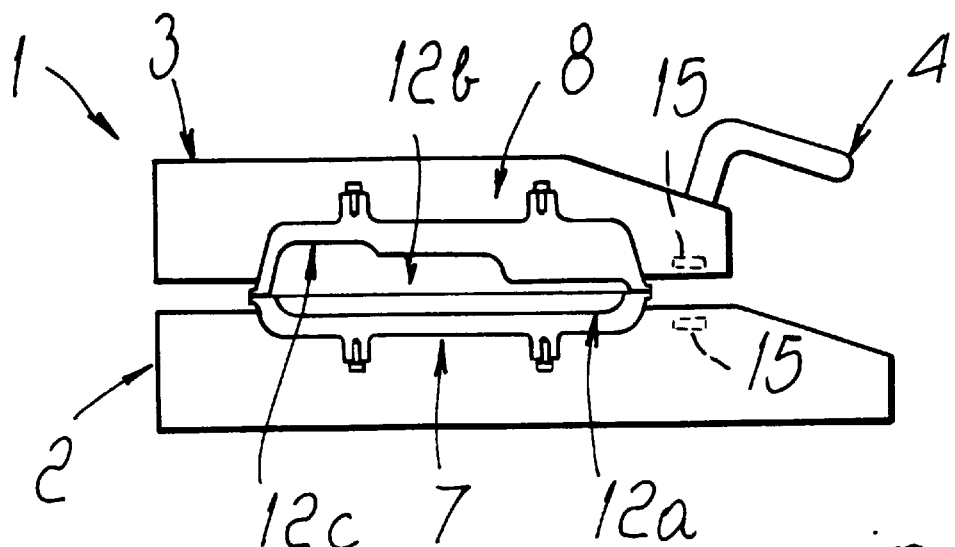
FIG. 2 is a side view of the food warmer of FIG. 1, showing the base and the cover diagrammatically.
Figure 3:
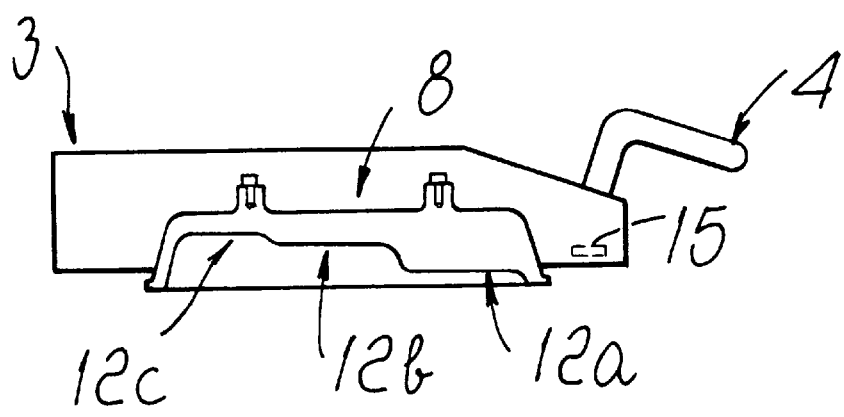
FIGS. 3 and 4 are further side views, similar to FIG. 2, which separately illustrate the cover and the base, shown stylized with the corresponding plates.
Figure 4:
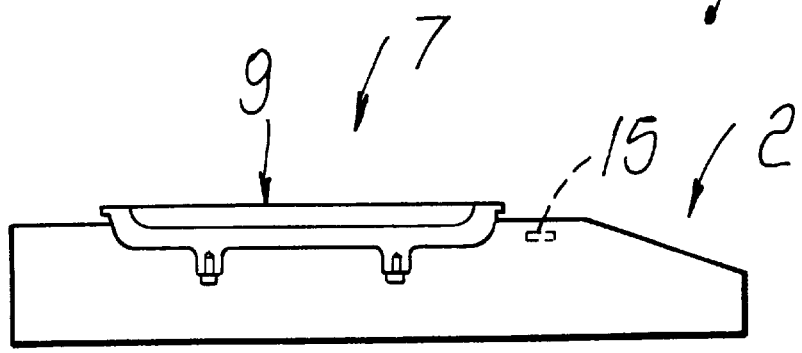
Figure 5:
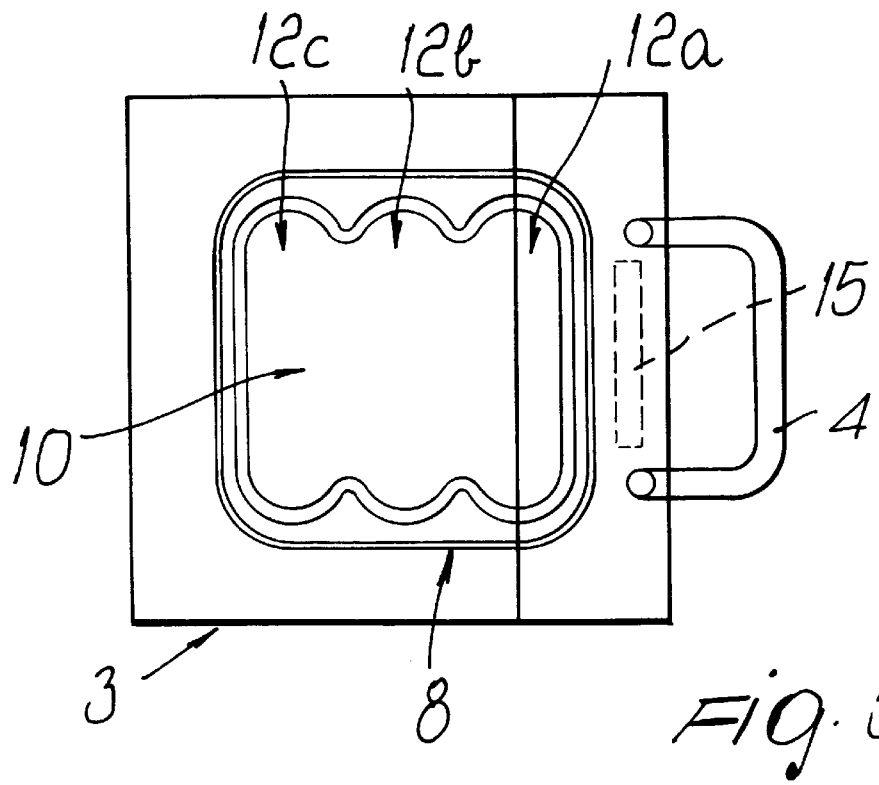
FIG. 5 is a plan view of the cover of the food warmer.
Figure 6:
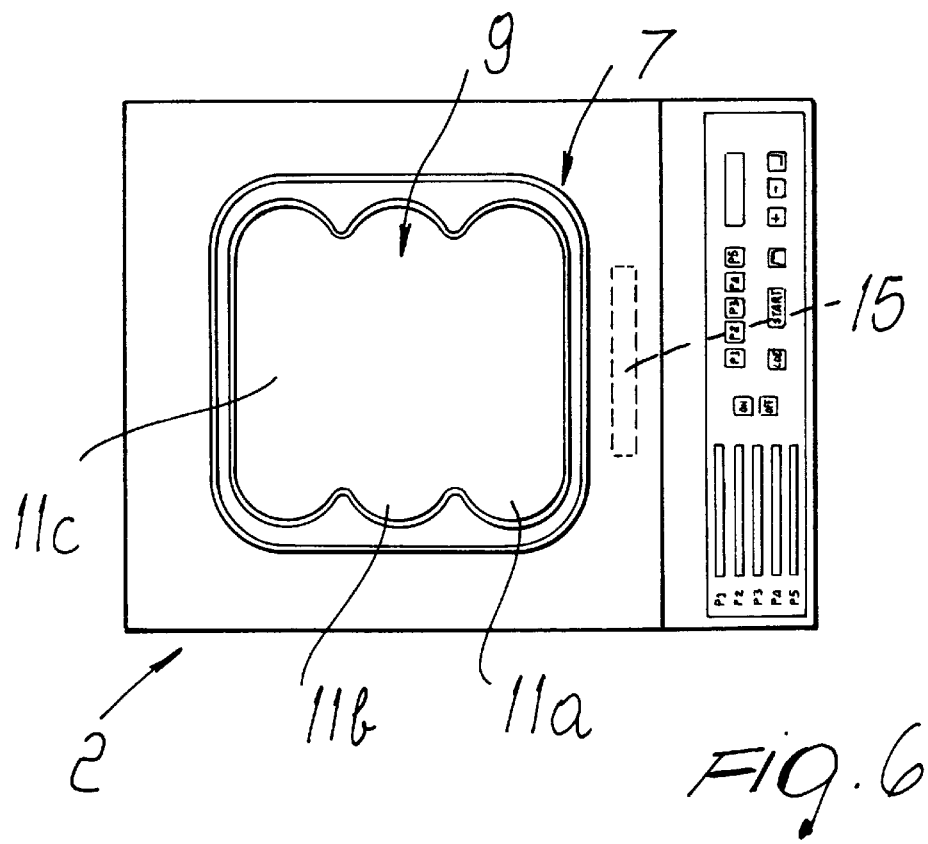
FIG. 6 is a plan view of the base of the food warmer.

With reference to the above figures, the reference numeral 1 designates a food warmer particularly for sweet and salted products, which is constituted by a base 2 to the rear of which a cover 3 is articulated which has a grip handle 4 for the user.

Suitable heating and insulating devices 15, such as resistors, and insulation means, as well as other means, such as switches 5, acoustic or light-emitting warning devices 6, and suitable wiring and means for supplying electric power thereto are provided inside the base 2 and/or the cover 3.

A first plate 7 and a second plate 8 are respectively associated at the base 2 and at the cover 3 and are made of a heat-conducting material and are externally coated with a layer of non-stick protective material known by the tradename "TEFLON" and have the same desired shape in plan view.

First seats 9 and second seats 10, having the desired shape and a chosen number, are provided respectively at the first and second plates 7 and 8.

In the particular embodiment illustrated in Figures, each one of the first and second seats 9, 10 is respectively divided into first compartments 11a, 11b, 11c and into second compartments 12a, 12b, 12c which are mutually identical in plan view.

Each one of the first and second compartments preferably but not necessary has the same shape.

The characteristic of the first compartments is that they have a constant depth.

As regards instead the second compartments 12a–12c, their depth increases, so as to form mutually adjacent seats for salted or sweet products which, despite having different thicknesses, can be stored simultaneously between the first plate 7 and the second plate 8 and heated without squashing them.

The number, the shape and the arrangement of the first and second seats 9, 10 formed in the first and second plates 7, 8 may of course be the most pertinent according to specific requirements.

It has also been observed that the invention thus conceived has achieved the intended aim and objects, since a food warmer has been obtained which allows to warm both sweet and salted products, heating the external container of the product but not its contents, even simultaneously for products having different dimensions/height.

It is possible to achieve high productivity, since it is possible to warm a large number of products per selected unit time, without altering the organoleptic characteristics of the ingredients placed for example inside the sandwich.

The materials employed may of course be the most pertinent according to specific requirements.

What is claimed is:

1. A food warmer for sweet and salted products, comyrising a base and a cover which are mutually articulated; at least one first and one second plate respectively accommodated into said base and cover; and heating and insulation devices for said at least one first plate and one second plate, wherein at least one of said first and second plates has at least one seat provided with at least two regions having different depths.

2. The food warmer according to claim 1, wherein a plurality of first and second seats are respectively provided at said first and second plates which are mutually adjacent and have different depths or heights so as to form first and second compartments for sweet or salted products having different heights to be arranged between said first and second plates with said cover closed.

3. The food warmer according to claim 2, wherein three second seats are provided.

4. The food warmer according to claim 2, wherein said second seats have an elongated oval shape in plan view.

5. The food warmer according to claim 2, wherein said second seats increase in height or depth.

6. The food warmer according to claim 1, wherein said first and second seats provided with at least two regions having different depths have a shape and a depth which is correlated to the sweet or salted product to be warmed.

7. The food warmer according to claim 1, wherein said at least two regions having different depths are mutually contiguous or not.

8. The food warmer according to claim 2, wherein said first and second seats are mutually separate or contiguous.

\* \* \* \* \*